March 31, 1925.
A. T. BROWN
AGRICULTURAL MACHINE
Filed Oct. 15, 1919
1,531,685
4 Sheets-Sheet 4
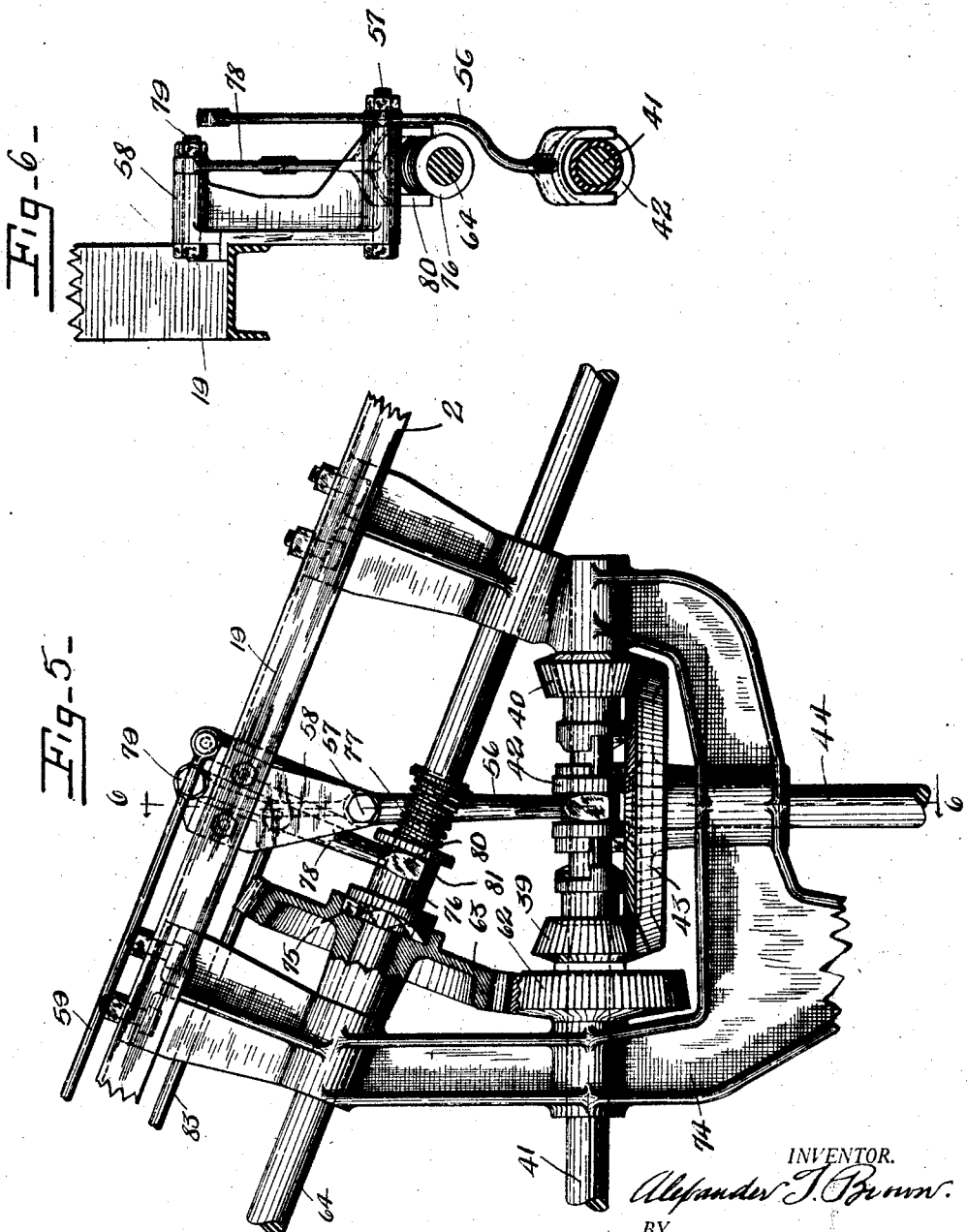

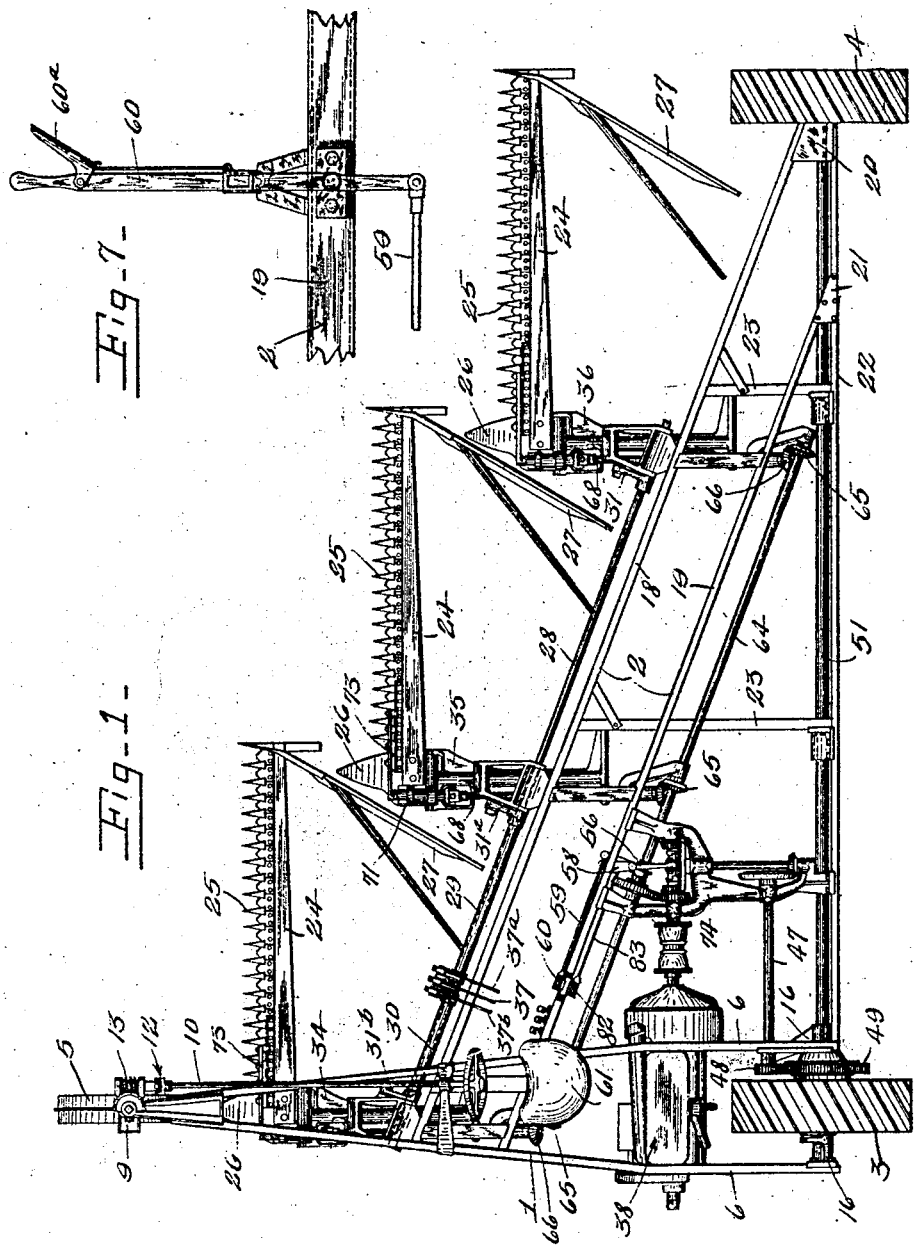

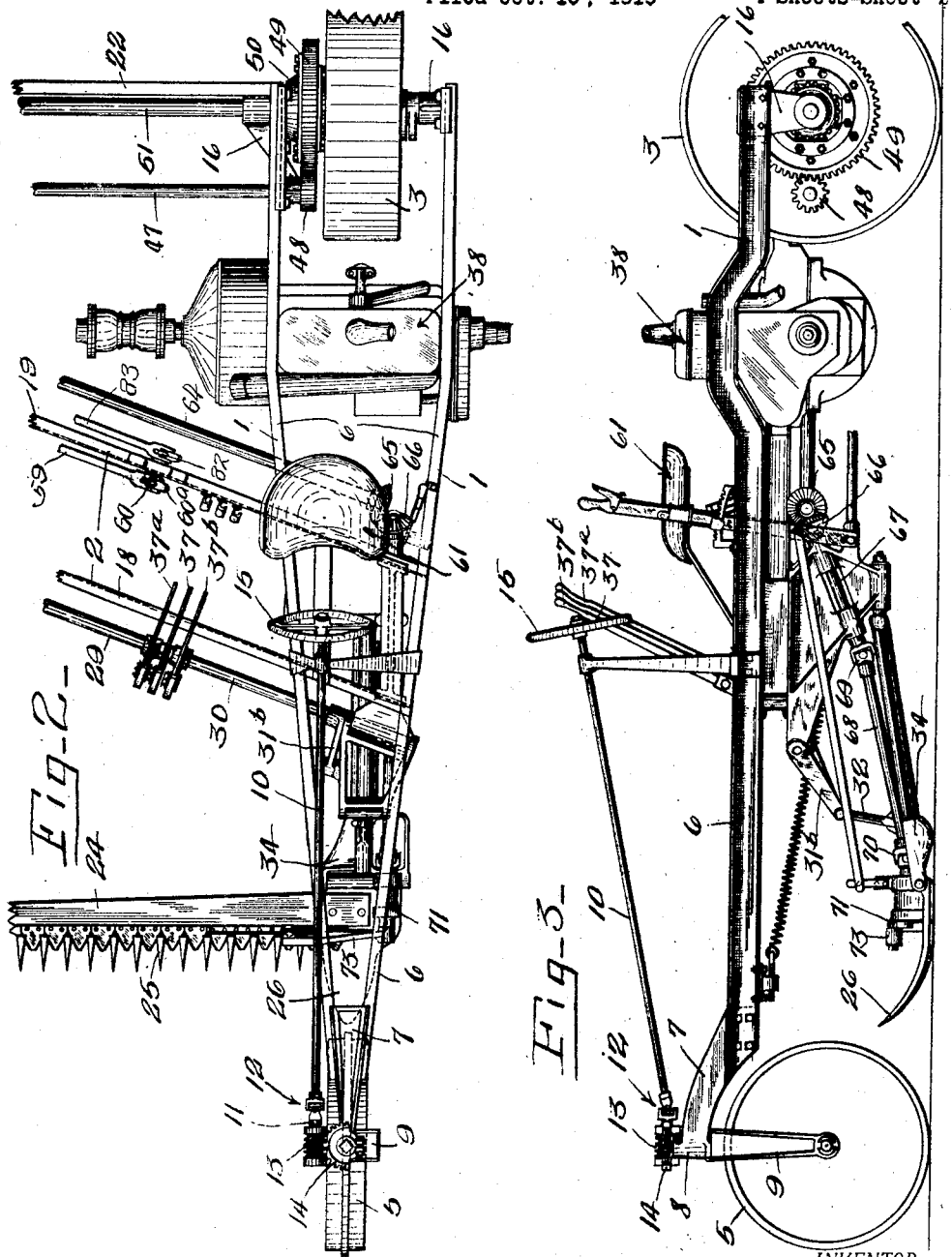

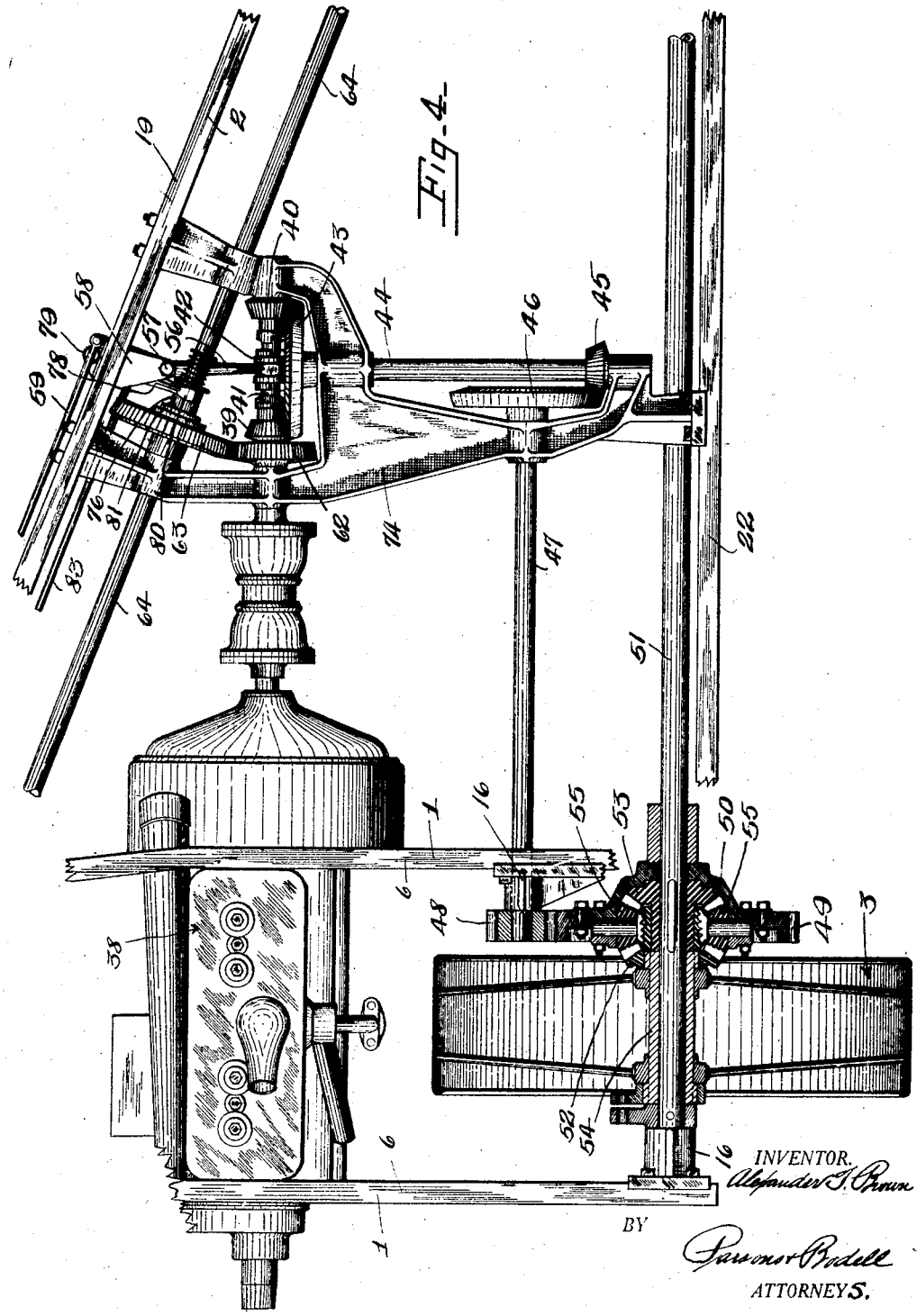

Patented Mar. 31, 1925.

1,531,685

UNITED STATES PATENT OFFICE.

ALEXANDER T. BROWN, OF SYRACUSE, NEW YORK.

AGRICULTURAL MACHINE.

Application filed October 15, 1919. Serial No. 330,754.

*To all whom it may concern:*

Be it known that I, ALEXANDER T. BROWN, a citizen of the United States, and a resident of Syracuse, in the county of Onondaga and State of New York, have invented a certain new and useful Agricultural Machine, of which the following is a specification.

This invention relates to power agricultural machines having a gang of implements, and has for its object a particularly simple and efficient and durable construction and arrangement of the frame, implements and actuating mechanism. The invention consists in the novel features and in the combinations and constructions hereinafter set forth and claimed.

In describing this invention, reference is had to the accompanying drawings in which like characters designate corresponding parts in all the views.

Figure 1 is a plan view of an agricultural machine, as a mower, embodying my invention.

Figures 2 and 3 are respectively, a fragmentary plan view and a side elevation of this machine.

Figure 4 is an enlarged plan view of the rear portion of the machine illustrating the power transmitting mechanism operated by the mower.

Figure 5 is a detail of the gears between the drive shafts and the reciprocating knife.

Figure 6 is an enlarged sectional view on line 6—6, Fig. 5, partly in elevation and parts being omitted.

Figure 7 is a detail view of the lever for shifting the clutch controlling the forward and rearward movements of the machine.

I have here shown my invention as embodied in a mowing machine, the implements of which consist of a finger bar and reciprocating members or knives.

The illustrated embodiment of my invention comprises a frame and implements as the finger bars and knives carried by the frame and extending laterally therefrom, the implements being arranged in step formation or in echelon one behind the other, each rear implement being arranged with its inner end in the rear of the outer end of the next forward implement, the implements being provided with swathboards at their outer ends to sweep the cut crop out of the way of the shoe at the inner end of the implement to the rear, the swathboard of the rearmost implement being arranged to sweep the cut crop out of the path of one of the rear driving wheels.

The frame is in the general form of a right triangle and comprises a lengthwise side portion along the altitude of the triangle and an inclined portion extending laterally from the intermediate part of the side portion, the frame being supported by a pair of rear wheels at the ends of the base of the triangle, that is, at the rear end of the side portion and at the outer end of the inclined portion, and by a steering wheel at the front end of the lengthwise portion. The implements are supported in a series along the hypothenuse of the triangle in front of the inclined portion of the frame but said implements are arranged substantially parallel to the base of the triangle.

1 designates the lengthwise side portion of the frame and 2 the inclined portion.

3 and 4 are respectively the rear wheels located at the rear end of the portion 1 of the frame and at the outer end of the portion 2. 5 is the steering wheel at the front end of the lengthwise portion 1 of the frame, the wheels 3, 4 and 5 being arranged substantially at the corners of a right angle triangle formation.

The lengthwise portion 1 of the frame, as here shown, includes side bars 6 which converge toward their forward ends and which are secured at their forward ends to a bracket 7 having an upright bearing 8 in which the spindle of the fork 9 for the front steering wheel 5 is journaled.

The spindle is turned about its axis by any suitable mechanism, as by a steering rod 10 connected at its front end to a shaft 11 by a universal joint 12, on which shaft 11 a worm 13 is mounted which meshes with the worm gear 14 on the upper end of the spindle for the fork 9. A hand wheel 15 is mounted on the rear end of the steering shaft 10. The rear ends of the bars 6 are spaced apart and formed with depending brackets 16 carrying bearings in which the rear axle is mounted.

The inclined portion 2 of the frame comprises bars 18, 19 suitably secured to the bars 6, the bars 18, 19 having webs 20, 21 at their outer ends to which is secured a frame member or bar 22 extending along the rear axle and connected to the rear end of one of the side bars 6. Suitable braces 23 are located at intervals between the bars 18, 19 and 22.

As before stated, the implements are mowers or cutters and include finger bars 24 and reciprocating knives 25. The finger bars 24 extend laterally and each is provided with a shoe 26 at its inner end and with a swathboard 27 at its outer end, the shoe 26 of the front finger bar being located directly in the rear of the steering wheel 5 and the shoe 26 of the second finger bar being located in the rear of the outer end of the front finger bar and in the rear of the swathboard 27 of the front finger bar, and the inner end of the next finger bar to the rear is similarly located relatively to the finger bar next in front of the same. The swathboard 27 at the outer end of the last finger bar of the gang is arranged to sweep the cut grain or grass out of the path of the wheel 4.

The front finger bar is supported from the lengthwise portion 1 of the frame in any suitable manner, and one way of supporting the same is shown in my pending application, Sr. No. 252,215, filed August 31, 1918.

The other cutters of the gang are similarly supported from the frame portion 2. The means for supporting these cutters and for raising and lowering the same form no part of this invention and they may be supported and raised and lowered in any suitable manner. However, in this embodiment of my invention the finger bars are raised and lowered by individual means as a shaft 28 carried by the frame portion 2, sleeves 29, 30 on said shaft, the shaft and the sleeves having rock arms 31, 31$^a$, 31$^b$ thereon connected as by links as 32 to the carriages 34, 35, 36 for the finger bars. The shaft 28 and sleeves 29, 30 are operated by suitable hand levers 37, 37$^a$, 37$^b$ mounted respectively thereon. These carriages 34, 35, 36 are mounted in any suitable manner, as in my pending application referred to, to swing up and down to cause the finger bars to float over the ground and conform to the humps and hollows in the ground.

38 is the motor carried by the frame portion 1, and connected to the movable members of the implement, as the knives and to the rear wheels 3, 4 through suitable connections.

The connections between the motor and the driving wheels 3, 4 comprise bevel pinions 39, 40 loosely mounted on the shaft 41 which is driven from the crank shaft of the engine, a clutch section 42 rotatable with the shaft 41 and shiftable from neutral position into engagement with either pinion 39, 40 to lock the same to the shaft 41, a bevel gear 43 mounted on a shaft 44 and meshing with both pinions 39, 40, bevel pinion 45 mounted on the shaft 44 and meshing with a gear 46 mounted upon a shaft 47 having a spur gear 48 thereon which meshes with a spur gear 49 mounted on a differential gear casing 50, said casing being mounted upon the rear axle or shaft 51 on which the wheel 4 is mounted.

The differential gearing includes opposing main gears 52, 53 mounted respectively upon the hub 54 of the drive wheel 3 and on the shaft 51 and compensating pinions 55 carried by the casing 50 and meshing with the gears 52, 53.

The clutch 42 is shifted by suitable means as by a lever 56 pivoted between its ends at 57 to a bracket 58 carried by the inclined frame portion 2, the lever having a fork at one end coacting with the clutch 42 and being connected at its other end to a shifting rod 59 extending along the frame portion 2 and connected to a hand lever 60, Fig. 7 located within reach of the seat 61.

The motion is transmitted from the motor to the reciprocating knives 25 through connections operated from the shaft 41, these connections being here shown as comprising a gear 62 mounted on the shaft 41 and usually fixed to or integral with the gear 39 and meshing with a gear 63 loosely mounted on a shaft 64 extending along and supported by the frame portion 2 and having beveled pinions 65 thereon at intervals which mesh with companion pinions 66 mounted upon shaft 67 connected to shafts 68 by universal joints 69, the shafts 68 being in turn connected by universal joints 70 to shafts mounted upon the shoes 26 of the contiguous implements and having crank arms 71 connected by links 73 to the reciprocating knives respectively.

The shafts 41, 44 and 47 are journaled in bearings formed in a suitable bracket 74 secured to the inclined frame element 2 and the rear bar 22. Likewise, the shaft 64 is suitably supported in bearings carried by the inclined frame portion 2. The gear 63 is connected to the shaft 64 by a clutch means which drives the gear 63 in one direction and permits the gear to remain stationary when the shaft rotates in the other direction. Hence, the knives do not reciprocate when the machine is backing up. As seen in Fig. 5 this means comprises ratchet mechanism.

As here illustrated (Fig. 5) this mechanism consists of a clutch face 75 having ratcheting clutch teeth provided on the hub of the gear 63 and a spring pressed clutch section 76 slidable on the shaft 64 and having teeth complemental to those of the clutch face 75. A spring 77 normally tends to hold the clutch section 76 engaged with the clutch face 75. This spring also permits the gear 63 to ratchet and turn loosely on the shaft 64 when the gear 39 and hence the gears 62 are turning in a retrograde direction as when the machine is being backed up. The clutch section is shifted out of its normal position to disconnect the knives from their driving mechanism when the machine is traveling forward by means of a lever 78 pivoted at one end at 79 to the bracket 58 and having a fork 80 in a groove 81 in the clutch section 76 and an operating lever 82 connected by a link 83 to the lever 78. The groove 81 is wide enough to permit the ratchet action of the clutch section 76.

The levers 60 and 82 are alike in construction except that the lever 60 is capable of being locked in three positions instead of two, by the pawl operated by the grip lever 60ª.

In operation, the machine can be driven forwardly or rearwardly in accordance with the position of the clutch section 42 and can be steered relatively to the work by the wheel 5, and owing to the arrangement of the gang of implements relatively to the frame, the work or the ground to be traversed by the implements is in full view of the operator so that the cutters are in the control of the operator, and further owing to the relative arrangement of the cutters the implements and the swathboards thereof, the cut grain or grass of one implement is swept out of the way of the next implement and also out of the way of the wheels so that the cut grain or grass is not harmed by the machine or implements running over it.

What I claim is:

1. In a mowing machine, the combination of a frame, a pair of rear wheels supporting the frame, and a front wheel supporting the front end of the frame and arranged in front of one of the rear wheels, a gang of cutting implements carried by the frame, the front implement having a shoe arranged behind the front wheel and the rear implement having a shoe at its inner end arranged behind the outer end of the next implement in front of such rear implement and the next implement in front having a swathboard at its outer end arranged to sweep the cut crop out of the path of the second-mentioned shoe, the rearmost implement having a swathboard arranged in front of the other rear wheel to sweep the cut crop out of the path of the same, substantially as and for the purpose set forth.

2. In an agricultural machine, the combination of a frame including a lengthwise extending side portion and a portion extending laterally from the side portion, wheels mounted at the rear end of the lengthwise side portion and at the outer end of the laterally extending portion, a steering wheel at the front end of the lengthwise side portion, implements supported by the frame and the laterally extending portion thereof, said implements extending laterally and positioned along the laterally extending portion of the frame one behind the other, the implements including movable members, an actuator carried by the inclined portion of the frame and common to the movable members of all the implements, a motor, power transmitting connections between the motor and the rear wheels and between the motor and the actuator, substantially as and for the purpose set forth.

3. In an agricultural machine, the combination of a frame including a lengthwise extending side portion and a portion extending laterally from the side portion inclining laterally and rearwardly from the lengthwise side portion, wheels mounted at the rear end of the lengthwise side portion and at the outer end of the laterally extending portion, implements supported by the frame and the inclined laterally extending portion thereof, said implements extending laterally and positioned along the inclined portion of the laterally extending portion, one behind the other, the implements including movable members, a shaft extending along said laterally and rearwardly extending portion of the frame, connections between the shaft and the movable members of the implements, a motor, power transmitting means between the motor and the shaft and power transmitting means between the motor and the rear wheels, substantially as and for the purpose described.

4. In a mowing machine, the combination of a frame including a lengthwise side portion, and a portion extending laterally from the side portion, wheels mounted at the rear end of the lengthwise portion and at the outer end of the laterally extending portion, said wheels being arranged in axial alinement, a steering wheel at the front end of the lengthwise side portion of the frame, laterally extending implements carried by the frame and arranged along the laterally extending portion of the frame, one behind the other, the front implement having a shoe arranged to travel in the path of the steering wheel and each rear implement having a shoe arranged in the rear of the outer end of the next foremost implement, each implement also having a swathboard at its outer end arranged to sweep the cut crop out of the way of the shoe at the inner end of the next rearward implement and the rearmost implement having a swathboard at its rear end arranged in front of the outer rear wheel, each implement including a movable member, a shaft extending along the laterally extending portion of the frame, connections between the shaft and the movable member, a motor mounted on the frame, connections between the motor and the rear wheels and connections between the motor and said shaft, and means for controlling the operation of said connections, substantially as and for the purpose specified.

5. In an agricultural machine, a frame comprising a lengthwise side portion, a laterally extending portion inclining rearwardly from the side portion, a frame member connecting the rear ends of said portion, wheels located at the rear ends of said portion, a wheel at the front end of the side portion, implements carried by the frame along the front side of the inclined portion of the frame, a motor carried by the frame, connections between the motor and the rear wheels and connections between the motor and the implements, the last-mentioned connection including a shaft common to all the implements and extending along the inclined portion of the frame substantially as and for the purpose described.

6. In an agricultural machine, a frame in the general form of a right triangle, wheels at the ends of the base of the triangle, a steering wheel at the front end of the frame, implements arranged in step formation and extending at right angles to the line of travel between the front end of the triangular frame and the outer rear end thereof, supports for said implements carried by the frame, the implements comprising movable members, and means for actuating said members comprising a shaft common to all of the implements, and extending in the direction of the hypotenuse of said triangle.

7. In an agricultural machine, a frame, the frame comprising a lengthwise side portion and a portion inclining laterally and rearwardly from the side portion, supporting wheels located at the rear end of the side portion, at the front end of the side portion and the outer end of the inclined portion, implements extending laterally from the frame and arranged in echelon along the inclined portion of the frame, the implements including movable members, actuating means for the movable members, comprising a motor mounted on the frame, a drive shaft carried by the inclined portion of the frame and extending lengthwise of such inclined portion, the drive shaft being common to all the implements and connections operated by the motor and the wheel at the rear end of the side portion of the frame.

In testimony whereof, I have hereunto signed my name, at Syracuse, in the county of Onondaga, and State of New York, this 30th day of Sept., 1919.

ALEXANDER T. BROWN.